US007065094B2

(12) United States Patent  
Petersen et al.

(10) Patent No.: US 7,065,094 B2  
(45) Date of Patent: Jun. 20, 2006

(54) METHOD AND DEVICE IN A COUPLING NODE FOR A TELECOMMUNICATION SYSTEM

(75) Inventors: Lars-Göran Petersen, Tumba (SE); Gunnar Larsson, Tumba (SE); Patrik Wiss, Stockholm (SE); Ulf Ekstedt, Saltsjöbaden (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1085 days.

(21) Appl. No.: 09/897,475

(22) Filed: Jul. 3, 2001

(65) Prior Publication Data

US 2002/0052970 A1    May 2, 2002

(30) Foreign Application Priority Data

Jul. 5, 2000    (SE)    .................................... 0002546

(51) Int. Cl.  
*H04L 12/66* (2006.01)  
*H04J 3/22* (2006.01)

(52) U.S. Cl. ...................... 370/401; 370/465; 370/466

(58) Field of Classification Search ................ 370/389, 370/392, 401, 420, 463, 465, 466  
See application file for complete search history.

(56) References Cited

U.S. PATENT DOCUMENTS 5,925,102 A    7/1999    Eilert et al. .................. 709/226

6,009,507 A    12/1999    Brooks et al. ................. 712/28  
6,266,342 B1 *    7/2001    Stacey et al. ................ 370/465  
6,549,945 B1 *    4/2003    Sinibaldi et al. ............ 709/226

FOREIGN PATENT DOCUMENTS

| EP | 0366344 B1 | 5/1996 |
| WO | WO97/29424 A | 8/1997 |
| WO | WO99/35773 | 7/1999 |
| WO | WO00/28778 Y | 5/2000 |

* cited by examiner

*Primary Examiner*—John Pezzlo  
*Assistant Examiner*—Saba Tsegaye

(57) ABSTRACT

The present invention relates to a coupling node (MG1) for coupling of communications in a telecommunication system, comprising networks (N1, N2) with different signal formats. The coupling node has switching and trunking functions (CP21, CP23) corresponding to the signal formats, and telefunctions, e.g. coders/decoders (F21) and echo cancellers (F22), which the node can couple into a communication by means of a selector (PS1). The functions are supported by printed board assemblies (CB1–CB9) in magazines (SR1), and the printed board assemblies have signal processors (DSP11–DSP13) with access points (SAP11–SAP14). The selector hunts one of the signal processors for handling one of the functions. If the processor has sufficiently free memory space in its data store and in its instruction memory and sufficient processor capacity, this processor is selected. Otherwise a new processor is hunted which is investigated in the same way.

22 Claims, 13 Drawing Sheets

METHOD AND DEVICE IN A COUPLING NODE FOR A TELECOMMUNICATION SYSTEM

TECHNICAL FIELD

The present invention relates to a device and a method for coupling, in a coupling node in a telecommunication system, a communication and thereby utilizing the processor resources of the coupling node in an effective manner.

STATE OF THE ART

Telecommunication systems composed by many different types of telecommunication networks have evolved. The networks can be either circuit-switched or packet-switched and can have different types of signal formats. The networks including the packet-switched ones are capable of transferring information in real time and offer in some cases a high quality on services provided, e.g. high availability, good audibility and unbroken communication. However, the networks are expensive for the operators to administrate if the requirement for high quality is to be maintained. These costs can be reduced if telecommunication networks available so far are replaced with an entirely new packet-switched network. However, this would mean destroying capital. Therefore, efforts have been made to create a gateway, through which certain networks can be connected retaining good quality of the services.

A gateway meeting the above-mentioned demands will become fairly complicated. Therefore, it has been important to make the gateway effective in the sense that many communications can be coupled through a certain gateway and that its collective resources can be fully utilized.

In an article by Stella Sofianopoulou, "Optimum Allocation of Processes in a Distributed Environment: A Process-to-process Approach" in J. Opl. Res. Soc. Vol. 41, No. 4, pp. 329–337, 1990, it is theoretically discussed how to choose, in a telecommunication system, processors for treating a number of processes in an optimal manner. The processes treated are, on one hand, connected to coupling of a telecommunication, and, on the other hand, connected to the internal work of the processors. More specifically, the article discusses how many processors are required to effectively take care of a certain number of processes.

The U.S. Pat. No. 6,009,507 describes a computer system with a number of signal processors connected to host computer. One of the signal processors is subsequently allocated a number of tasks so that the processor is fully utilized. When it becomes fully occupied with a task, the system selects a new processor to finish the task.

The international patent application WO 99/35773 describes a system with processors, each processing call setups. Data for the setups is distributed among the processors by a resource handler.

The European patent application EP 0 366 344 B1 describes a system with a plurality of nodes, each having a processor. These are to process enquiries on carrying out certain tasks. The processors have a determined maximum capacity and a total work load is distributed with the aid of addresses to the processors. The addresses are entered onto a list, and to avoid overloading the processors, one processor is deleted from the list when its load exceeds a threshold value and is re-entered onto the list when the load has decreased below another threshold value.

SUMMARY OF THE INVENTION

A telecommunication system most often comprises different telecommunication networks, connected through nodes. By setup of a connection in a telecommunication system via these coupling nodes, functions in the node required for the communication, are coupled in sequence. The present invention addresses a problem of utilizing the processors of the node in an effective manner when handling these functions.

Another problem having been addressed is to utilize the processors in the node in a flexible manner.

Yet another problem having been addressed is also to utilize the communication resources of the node in an effective manner.

The problem is solved by haunting a processor, being a suitable candidate for handling at least one of the functions in the sequence for the communication in question. Subsequently it is investigated if the processor has sufficient capacity to handle the function. If this is not the case, a new processor is selected as candidate and investigated in a corresponding manner.

More exactly the problem is solved in that the investigation comprises establishing whether the processor has sufficient space in its instruction memory and its data store, and that it has sufficient processor capacity to carry out the function itself. If this is the case, i.e. if the function can be allocated to the processor, the computer code of the function is loaded into the processor. The processor does not have to be allocated in advance to handle certain of the functions, rather the processors in the node can be investigated and the functions allocated to them as the functions are to be coupled into the communication. The problem of utilizing the internal communication resources of the node is solved by selecting the functions so that the communication paths between the functions are short.

Thus, an overarching object of the present invention is to couple a telecommunication between different networks via at least one coupling node and thereby to utilize the processor resources of the node effectively when handling the functions.

Another object is to be able to utilize the processor resources of the node in a flexible manner.

The nodes are composed of magazines with printed board assemblies, carrying the processors. Thereby, a further object is to be able to utilize the processor capacity of all printed board assemblies as a common resource in the node to handle the functions.

Yet another object is to be able to utilize the processors in one of the nodes to handle functions from another of the nodes.

Another object is to utilize the internal communication resources of the node effectively.

The invention has the advantage that the total processor capacity in the nodes are utilized.

Another advantage is that the code for the function in question does not have to be stored permanently in a processor. Instead, the code can be loaded into the processor when needed for a communication, and thereafter the processor can be used for other functions or other objects.

Another advantage is that the number of different types of printed board assemblies can be reduced, compared to known solutions.

Yet another advantage is that the internal communication resources of the nodes are utilized effectively.

The invention will now be described in more detail with the aid of preferred embodiments and with reference to the enclosed figures.

PREFERRED EMBODIMENTS

Figure 1:
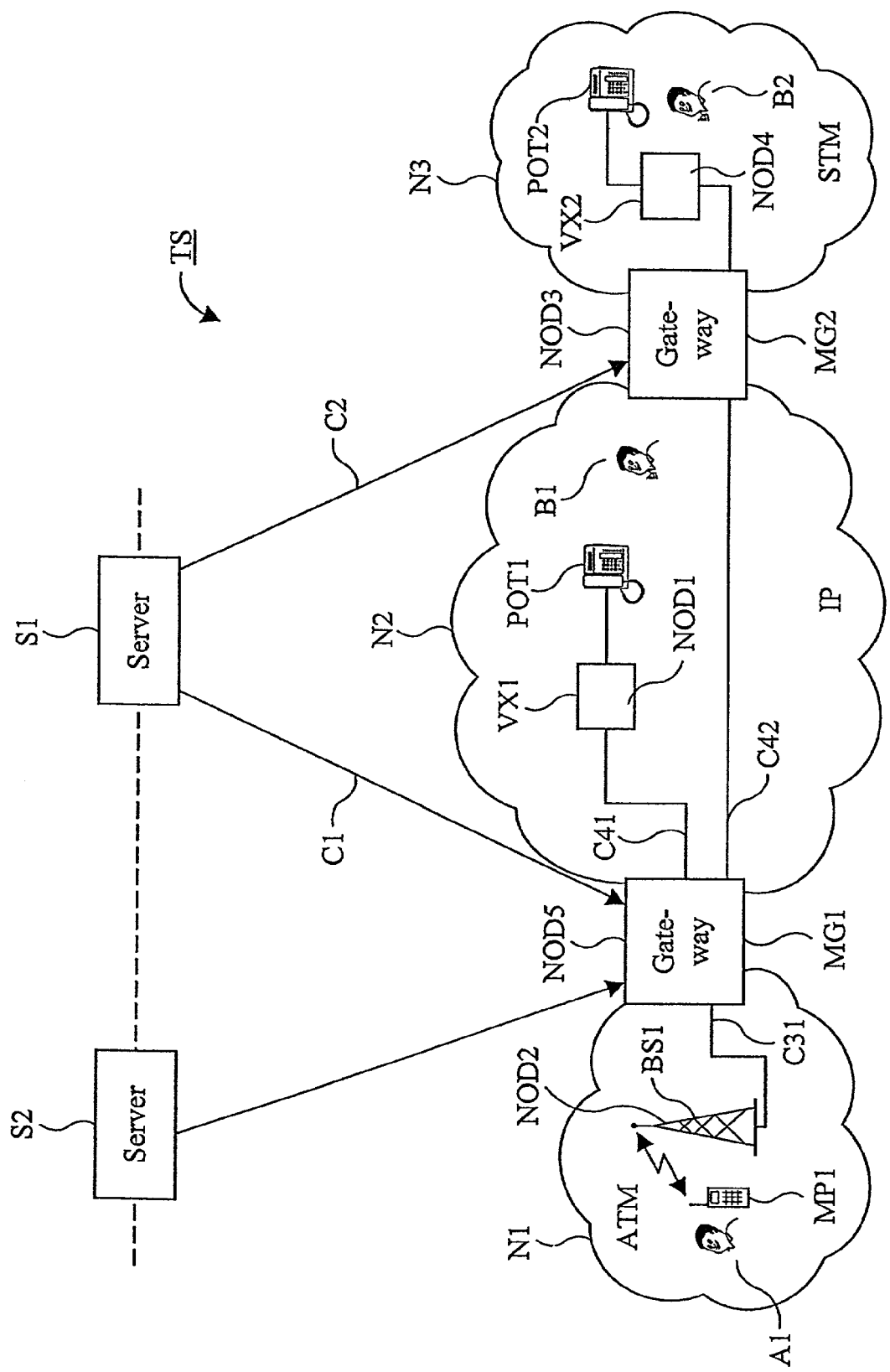
FIG. 1 shows a view of a telecommunication system.

FIG. 1 shows, as an example, a view of a part of a telecommunication system TS, comprising a first network N1, being an ATM-network, a second network N2, being an IP-network, and a third network N3, being a STM-network. The term ATM here stands for Asynchronous Transfer Mode. The second network 2 is, on one hand, connected to the first network N1 through a first gateway MG1 and, on the other hand, connected to the third network N3 through a second gateway MG2. The telecommunication system also comprises a control server S1 for controlling coupling of communications. The server S1 is connected to the gateway MG1 via a connection C1 and to the gateway MG2 via a connection C2. The Figure also shows that further servers, e.g. the server S2, takes part of the telecommunication system and are in this example connected to the gateway MG1. In the network N1 there is a first subscriber A1 with a mobile terminal MP1, which can be coupled to its network through a base station BS1. The base station is connected to the gateway MG1 via a connection C31. In the network N2 there is a second subscriber B1 with an orginary, circuit-switched telephone POT1, connected to the gateway MG1 via a switchboard VX1. The mobile terminal MP1 and the telephone POT1 can, via the gateway MG1, be connected to each other so that the subscribers A1 and B1 can talk to each other. In the third network N3 there is a third subscriber B2 with a telephone POT2 connected to the second gateway MG2 via a switchboard VX2. The subscriber B2 can, via the gateway MG2, be connected to the other subscribers. The structures of the gateways MG1 and MG2 and how the coupling is carried out, will be described closer below with the aid of a few embodiments.

Figure 2:
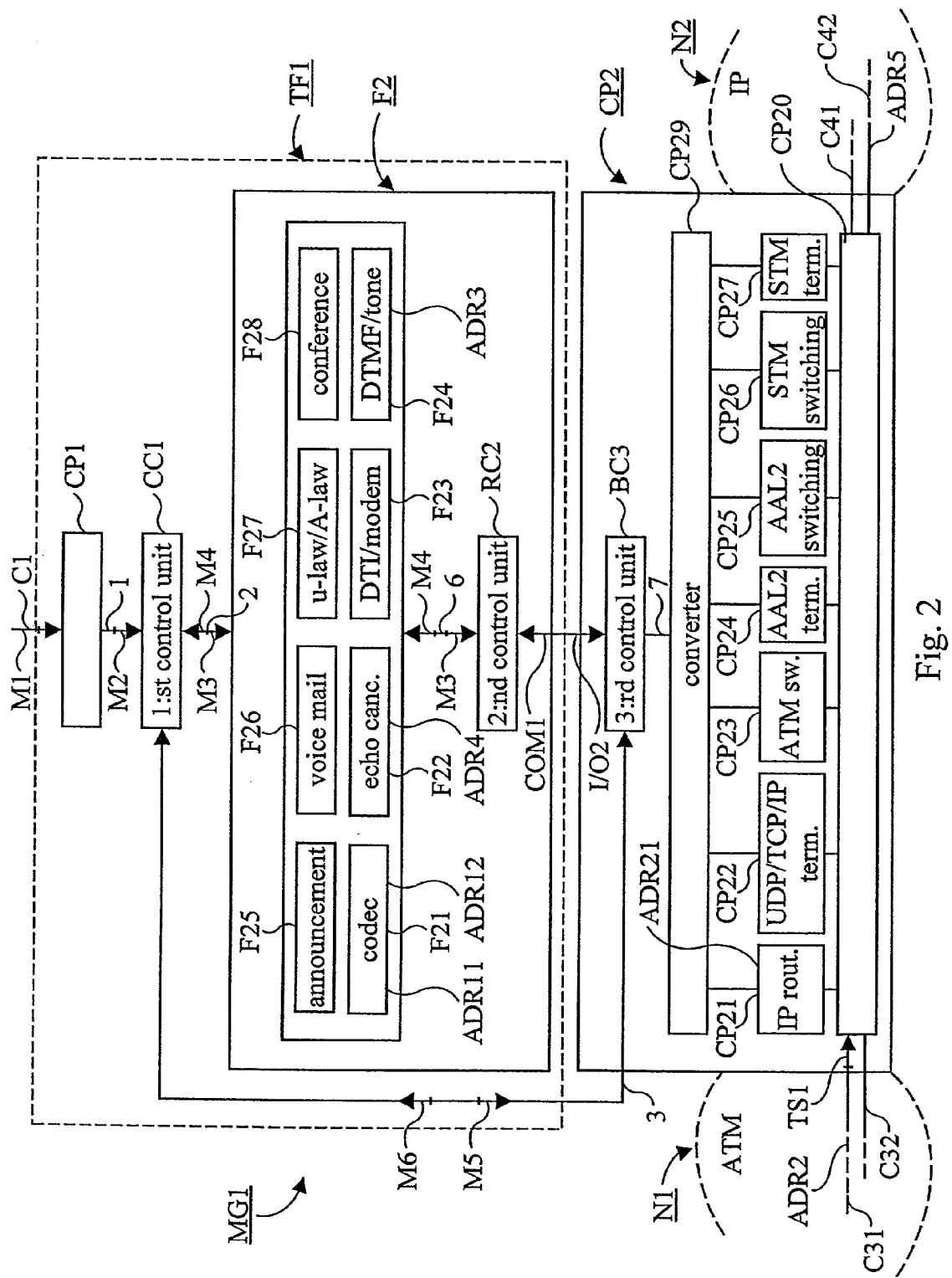
FIG. 2 shows a block diagram of a coupling node.

FIG. 2 shows the logical structure of the gateway MG1, which has two main parts, a telefunction part TF1 and an interface block CP2. The telefunction part comprises a function block F2 having function devices with telefunctions F21–F28 being used in telecommunications. According to the example, the function F21 is a coder/decoder, the function F22 is an echo canceller, the function F23 is a modem, the function F24 generates a tone signal ordering a ring signal at a subscriber, the function F25 is an announcement function generating spoken standard announcements, the function F26 makes it possible for a subscriber to leave a voice mail, the function F27 makes conversions between digital u-law and A-law, and the function F28 attends to conference coupling. The telefunction part TF1 also comprises a signal processing unit CP1, connected to the server S1 by the connection C1, and a first control unit CC1 for internally in the gateway MG1 control the setup of a communication. The first control unit CC1 is connected, on one hand, to the signal processing unit CP1 through an interface 1, and, on the other hand, to the function block F2 through an interface 2. The function block F2 has a second control unit RC2 connected to the function devices with the telefunctions F21–F28 through an interface 6 and which controls the allocation of the resources in these telefunctions. Each of the telefunctions are provided in several editions.

The interface block CP2 comprises a physical line interface CP20 having external connections C31, C32, C41 and C42. Included in the block CP2 is a signal format converter CP29 function devices with switching and trunking functions CP21–CP27 for handling transformations of different signal formats of signals being changed via the external connections. The block CP2 also has a third control unit BC3 being connected to, on one hand, the signal format converter CP29 through an interface 7, and, on the other hand, to the second control unit RC2 via an interface I/O2, and is also connected to the first control unit CC1 through an interface 3. According to the embodiment, the interface block CP2 has the following switching and trunking functions. The function CP21 is an IP-path selector, the function CP22 terminates IP, TCP and UDP, the function CP23 couples ATM-cells, the function CP24 terminates AAL2 (ATM Adaption Layer type 2), the function CP25 couples AAL2-packets, the function CP26 couples STM-channels, and the function CP27 terminates STM-channels. Also the switching and trunking functions are each provided in several editions.

The above stated parts in the gateway MG1 have the following functions.

The signal-processing unit CP1 exchanges signals M1 with the server S1 via the connection C1. Among other things the unit handles security and admission functions, verifies that messages have been received, registers incoming and outgoing messages and announces to the server when changes in status in the gateway have taken place. The signal M1 has two parts, one part with an address head and one part with the contents itself, so-called payload, which is divided into different packages. The signal-processing unit CP1 separates the address head on a received signal and forwards the packets to the first control unit CC1 via the interface 1.

The first control unit CC1 receives the signal packets, a signal M2, from the signal-processing unit CP1 and, on the basis thereof, requests the required telefunctions F21–F28. The first control unit activates or deactivates external connections as can be seen from the signal M2, and activates or deactivates internal connections between the telefunctions and the external endpoint of the connections.

The second control unit RC2 handles the earlier mentioned telefunctions F21–F28. The second control unit has information about how many editions of a certain telefunction that are available. It also has information about where the functions are located in a structure of carriers supporting the function devices, i.e. the control unit has the function addresses of the telefunctions. The first control unit CC1 requests via a signal M3 one of the telefunctions from the second control unit. The second control unit sends a message M4 with a function address for the telefunction, including information about the location of the function on the carriers, to the first control unit.

The telefunction part TF1 has, as can be seen from the description above, the two internal interfaces 1 and 2. The interface 1 is intended to keep reception and processing of the message M1 itself separated from the operations caused by the message. By means of the interface 2, the first control unit CC1 can set aside the telefunctions F21–F28 for a communication or free them whenever they are no longer needed for the communication.

In the interface block CP2, the line interface CP20 has different types of physical interfaces having different transfer rates 1,5, 2, 34 or 155 Mbps. The third control unit BC3 can carry out the functions of coupling the signal format converter CP29 and the switching and trunking functions, of coupling one or more of the telefunctions, as well as of hunting a free outgoing partial communication to the next node in the communication, and establish it. For carrying out these functions, the third control unit receives a signal M5 from the first control unit with information about the incoming connection and about the function address for the telefunction to be coupled. The signal M5 can also contain information about a node to which a partial communication is to be coupled as a continuation of the incoming communication. The third control unit BC3 emits a signal M6 to the first control unit CC1, which signal can contain, among other things, information about which communication is established to the next node. The signal format converter CP29 with the switching and trunking functions CP21–CP28 converts incoming signal formats to a common signal format COM1 and also reconverts signals from this format to an outgoing signal format for the established communication to the next node.

A feature of the gateway MG1 is that the telefunctions in the function block F2 remain unchanged and independent of which networks the gateway is connected to. New functions can be added but the functions themselves are to remain unchanged over time. Another feature of the gateway is that any telecommunication network can be connected with the aid of the gateway and new corresponding switching and trunking functions can be added. It is essential that the telefunctions and the switching and trunking functions can be stored in the form of hardware or software and can be stored anywhere within their respective block. Also, the gateway can easily be expanded for increased capacity.

The gateway MG1 utilizes the fact that the signals by the connection C31 or C32 are connected to their respective switching and trunking functions CP21–CP27, and are subsequently converted to the common signal format COM1 in the converter CP29. Thereafter, the latter converts the signals to a signal format which is adapted for that one of the switching and trunking functions CP21–CP27 which is used, when the signal is to be forwarded on a partial communication to the next node via the connection C41 or c42. Between these two conversions, one or more of the telefunctions functions F21–F28 can be connected via the connection I/O2, if this is necessary for the communication. Additionally, a communication, which has already been setup, being in progress and taking place between the two subscribers A1 and B1, can be opened and one or more further telefunctions can be added. Examples of such functions being added is the conference function F28 for couple further subscribers to the communication or the function F25 with standard messages. All the telefunctions operate in the common signal format COM1, which is the format that the signals have in the connection I/O2. When a communication is coupled via the gateway MG1, it can so happen that none of the telefunctions in the function block F2 needs to be engaged. However, the transferred signals have different formats at the inlet and at the outlet, and the incoming signal is converted, as mentioned above, to the common signal format in the converter CP29 to be converted again to the outgoing signal format.

The gateway MG1 and also the gateway MG2 are from a logical point of view structured in a way described in connection to FIG. 2, with the three separate cooperating control units CC1, RC2 and BC3. This structure makes it possible for the gateway to obtain the features mentioned above. The common signal format COM1 can be a format known within the technical field, and this is the case in the present embodiment. Here the format AAL2 is utilized, AAL2 denoting ATM Adaption Layer type 2, where ATM in turn denotes Asynchronous Transfer Mode. In connection with the FIGS. 3, 4, 5 and 6, it will be explained, with the aid of a few embodiments, how the gateway MG1 or MG2 works.

Coupling of a Communication from Subscriber A1 to Gateway MG1

Figure 3:
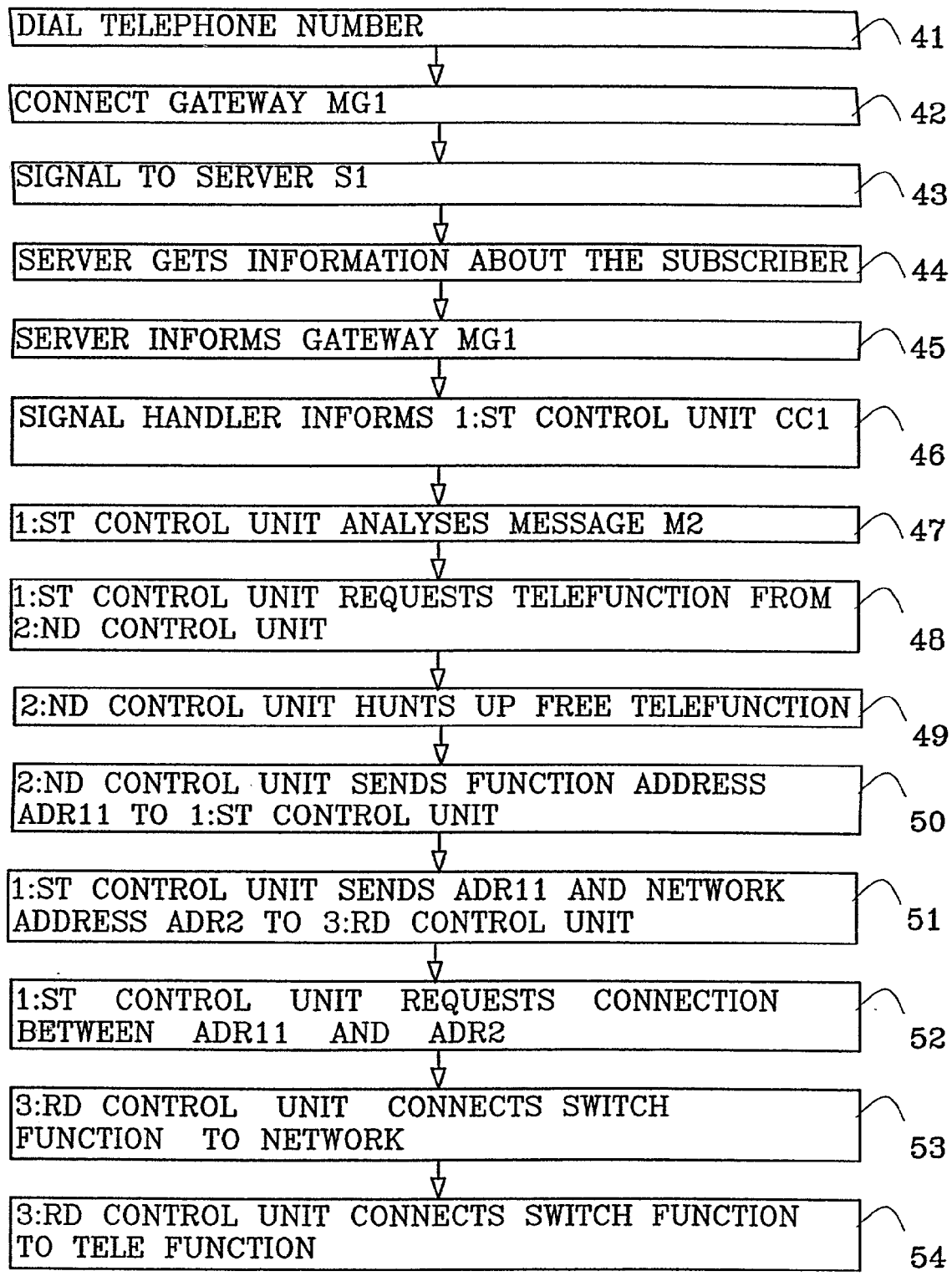
FIG. 3 shows a flowchart of coupling of a communication from a calling subscriber to a gateway.
Figure 4:
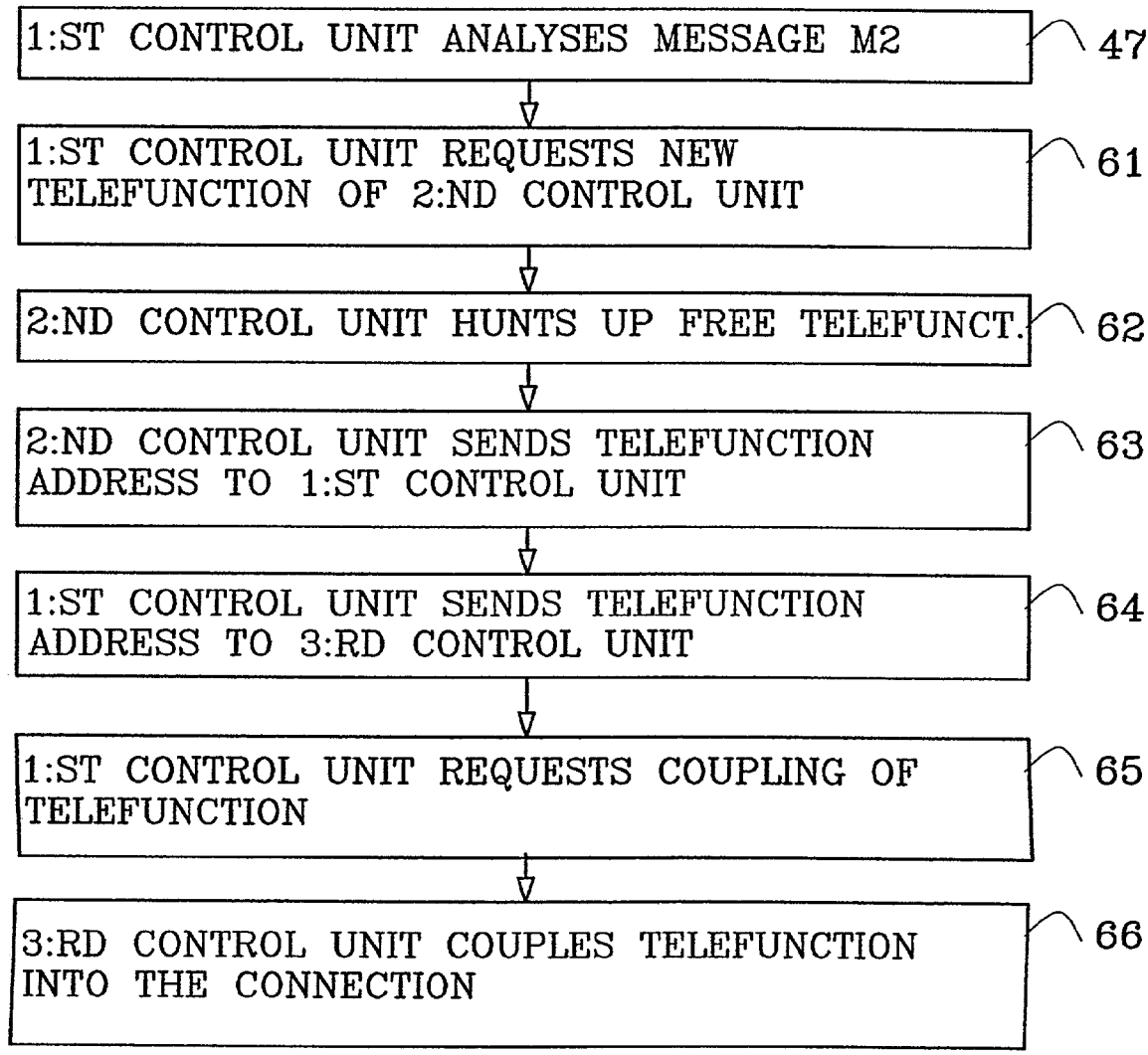
FIG. 4 shows a flowchart of coupling of a telecommunication function in the communication according to FIG. 3.
Figure 5:
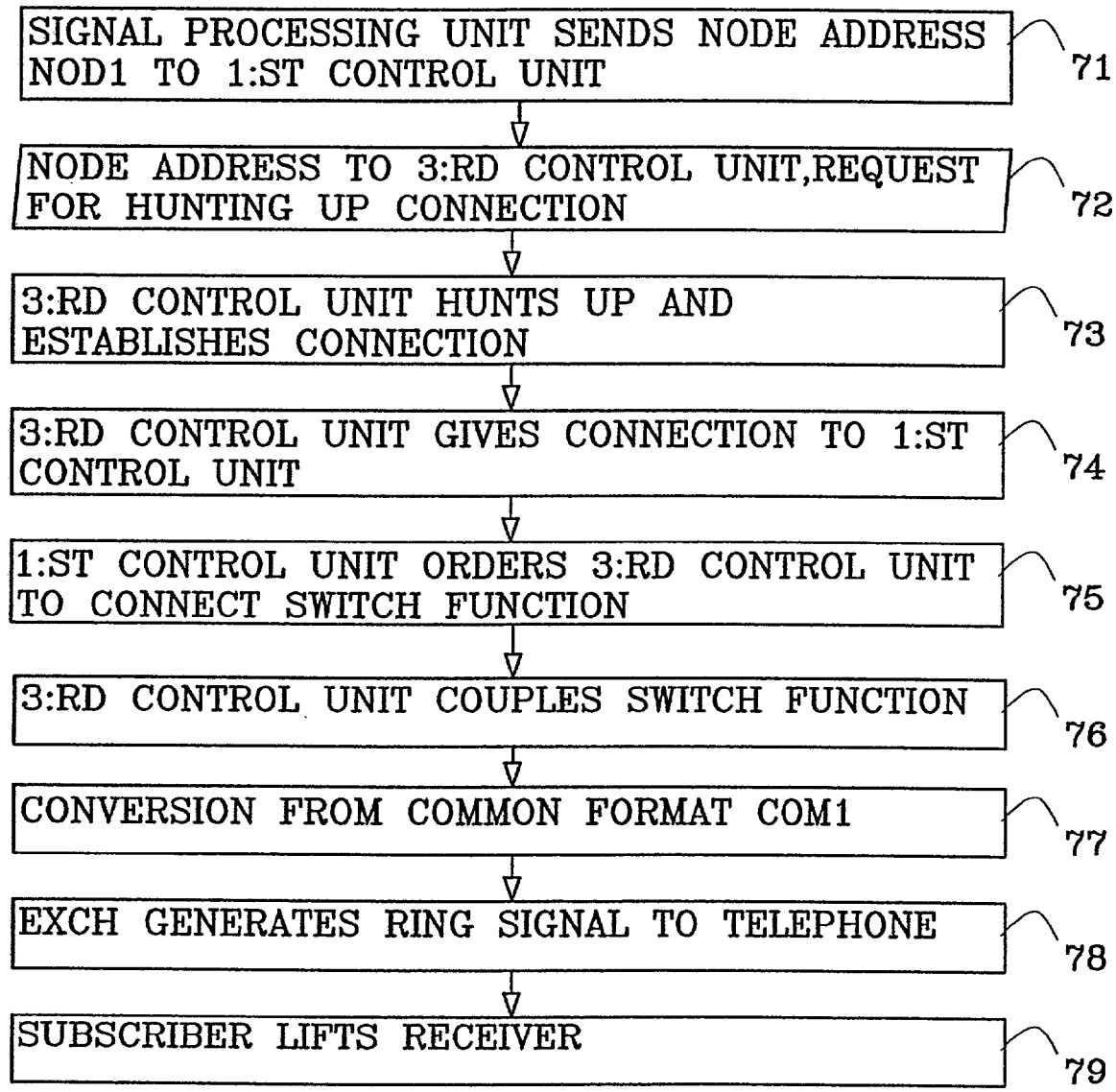
FIG. 5 shows a flowchart of coupling of the communication from the gateway to yet another node in the telecommunication system.

In connection to FIG. 1 it was initially mentioned that the two subscribers A1 and B1 are connected to each other so that they can talk. A first part in this communication is a call request from the subscriber A1 and coupling of the communication to the gateway MG1 with a signal converter and coupling of at least one of the telefunctions. In FIG. 3 a flowchart is shown of this first part of the communication.

The subscriber A1 dials in a conventional manner, on his/her mobile terminal MP1, the telephone number to the telephone POT1 of the subscriber B1 according to block 41 and is connected via the base station BS1 to the gateway MG1 through the connection C31 according to block 42. The signalling from the subscriber A1 is coupled through the connection C1 to the control server S1, block 43. This server detects which signal format the subscriber A1 has, in this case compressed speech, and also detects that the network N1 is an ATM-network, all this according to block 44.

When receiving a call from the subscriber A1, the server receives certain pieces of information from the subscriber B1, so that the server can determine the node address for the next node which has to be coupled. Thereby, the server S1 has the information needed to connect the subscribers A1 and B1. The server sends, through the communication C1, control signals in the form of the message M1 to the gateway MG1 and, more specifically, to the signal-processing unit CP1 according to block 45. The message M1 is a standard protocol with an address head and an information part divided into different data packets. The signal-processing unit CP1 separates the address head and sends the information part of the control signals with the message M2 to the first control unit CC1 according to block 46. This information part is analyzed by the first control unit with respect to, among other things, information about which telefunctions are required and information about the signal format and a network address ADR2 for the communication from the subscriber A1, all this according to block 47. The first control unit CC1 sends, with the message M3, a request to the second control unit RC2 for one of the telefunctions, block 48. The mobile terminal MP2 of the subscriber A1 sends encoded speech, which has to be decoded to be understood by the telephone POT1 of the subscriber B1. Thus, the message M3 contains a request for the telefunction F21 with a coder/decoder function. The second control unit RC2 hunts a free function among these functions according to block 49 and sends its function address ADR11 with the message M4 to the first control unit CC1 according to block 50. The first control unit now sends, with the message M5, the function address ADR11 to the available function F21 as well as the network address ADR2 for the incoming communication to the third control unit BC3 according to block 51. The first control unit also sends, with the message M5, a request for the third unit to couple the network address ADR2 to the address ADR11 for the selected, available coder/decoder function F21 according to block 52. The third control unit BC3 couples, according to block 53, the switching and trunking function corresponding to the network address ADR2, in this example the function CP23 for ATM-switching. The function CP23 is connected to the telefunction F21 according to block 54. Thus, a speech signal TS1, arriving later on the connection C31 from the subscriber A1, can be received by the switching function CP23 and transformed to the common signal format COM1 in the signal format converter CP29. Subsequently, the speech signal TS1 can be decoded via the telefunction F21, operating in the common signal format, before this speech signal is coupled any further.

Coupling of a Further Telefunction in the Gateway MG1

In the example above only one of the telefunctions is coupled, i.e. the coder/decoder function F21. Often many telefunctions have to be coupled and this is also the case here. The subscriber B1 has the telephone POT1, which has to have a ring signal, and additionally echoes can occur in the communication. Thus, the tone-generating function F24 and the echo canceller F22 have to be coupled.

When the subscriber A1 made a call, a message was sent to the server S1 about the called subscriber B1. Thereby, the server has information about the node address NOD 1 of the subscriber B1, and that the latter requires a ring signal and echo cancelling. This information was passed on to the gateway MG1 with the message M1 and further with the message M2, and was analyzed in the first control unit CC1. In connection with the flowchart in FIG. 4, it will be described how the further telefunctions are coupled to the communication.

According to block 47 in FIG. 3, the first control unit CC1 analyzes the message M2. This control unit now requests, according to block 61, the next telefunction from the second control unit RC2 with the message M3. According to the example, this second telefunction is the telefunction F24 for tone-generating. The second control unit hunts an available copy of this function according to block 62, and sends, according to block 63, the function address ADR3 of the function F24 with the message M4 to the first control unit CC1. This control unit sends, with the message M5, the function address ADR3 of the telefunction F24 to the third control unit BC3 according to block 64 and also sends, according to block 65, a request to couple the telefunction F24 into the communication. The third control unit BC3 couples, according to block 66, this telefunction into the communication, which, according to the above, is in a stage where it has already been converted to the common signal format COM1. The first control unit continues the analysis of the message M2 and the method according to FIG. 3 is repeated if additional telefunctions are to be coupled. This is the case in the present example, and also the telefunction F22 for echo cancelling, having a function address ADR4, is coupled into the communication when this is of the common signal format COM1.

It should be noted that the coupling method in the gateway MG1 remains the same as that described in the two examples above, even if the incoming communication on the connection C31 would come from some other node than the base station BS1 with the address NOD2. An example of such an alternative node is another gateway, e.g. the gateway MG2 with a node address NOD3. Switching and trunking functions and telefunctions may have to be selected differently, but the coupling method itself remains unchanged.

Coupling from the Gateway MG1 to the Subscriber B1

As mentioned above, the server has information about the called subscriber B1, and thereby it can determine the next node to which the communication from the subscriber A1 is to be coupled. The next node would be, according to an example, the next gateway MG2 but is, according to the present embodiment, the switchboard VX1 having the node address NOD1 to which the subscriber B1 is connected. How the communication from the subscriber A1 is further coupled with a partial communication to the switchboard VX1 is described below in connection with FIG. 5.

The server S1 has information about that the switchboard VX1 has the node address NOD1, and sends this information with the message M1 to the signal-processing unit CP1. This in turn sends the node address NOD1 to the first control unit CC1 with the message M2 according to block 71. The first control unit sends, with the message M5, the node address NOD1 to the third control unit BC3 together with a request to hunt an available communication to the node, all this according to block 72. The third control unit BC3 hunts an available communication, according to the example the communication C41, and establishes this according to a block 73. The third control unit sends, along with a message 6, information about the established communication C41 to the first control unit CC1, block 74. The first control unit sends, according to block 75, a message to the third control unit BC3 to couple the switching and trunking function which corresponds to the established communication C41. The third control unit hunts the function CP21 for IP-routing, having an address ADR21, and couples this function to the most recently coupled telefunction in the communication according to block 76. The signal format converter CP29 converts the common signal format COM1 to a signal format for the established IP-connection according to block 77. The switchboard VX1 is now connected and generates, upon a signal from the telefunction F24, a ring signal to the telephone POT1 according to block 78. The subscriber B1 receives the call by lifting his/her handset, block 79.

Coupling of a Communication via a Further Gateway

Figure 6:
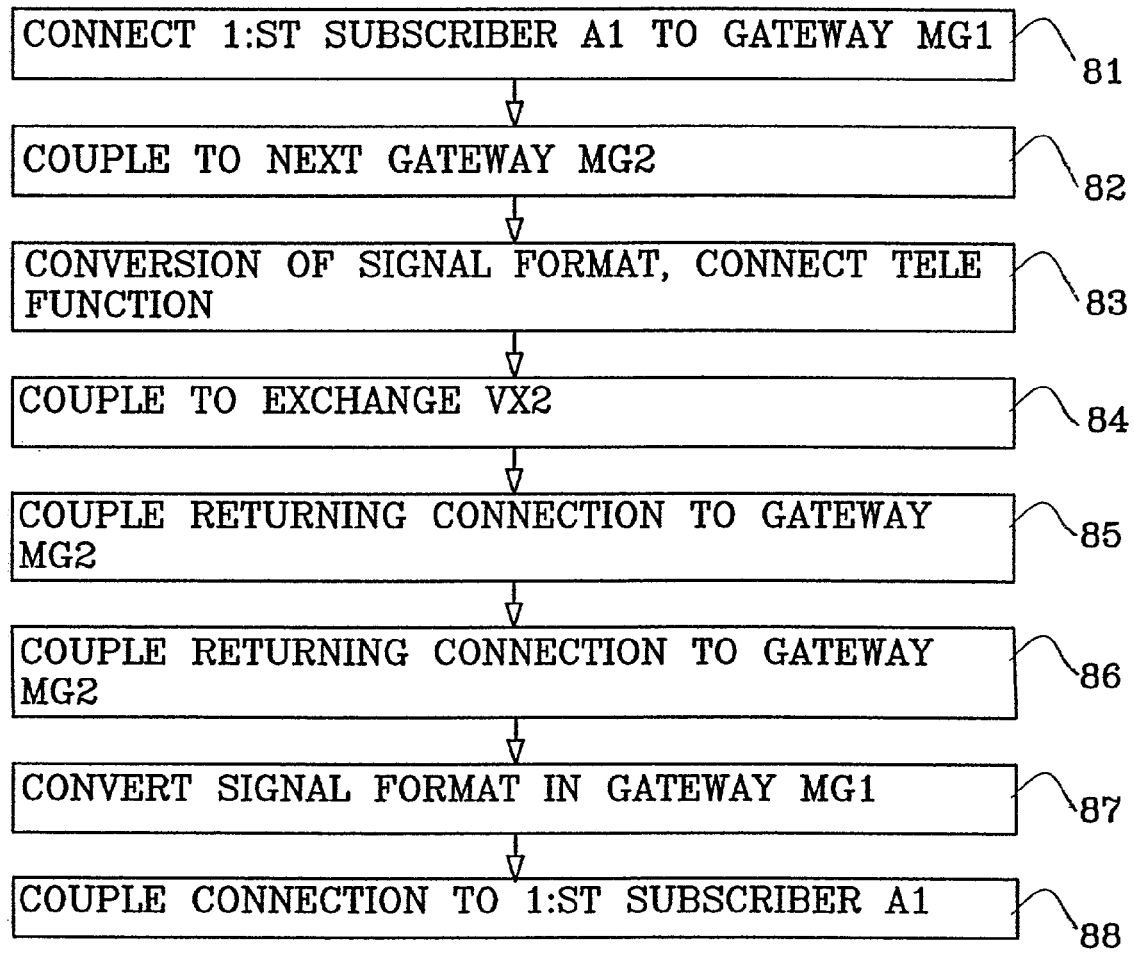
FIG. 6 shows a flowchart of coupling of a communication over more than one gateway in the telecommunication system.

In connection with a flowchart in FIG. 6, coupling of a communication between the first subscriber A1 and the third subscriber B2 in the network N3 will be briefly described. In the first part of the communication from the subscriber A1 to the gateway MG1 only the switching and trunking functions CP23 for ATM-switching is coupled, and the communication is converted to the common signal format COM1. This first step is specified with block 81. Thereafter, the gateway MG1 couples the communication further to the gateway MG2 via the network N2 according to block 82. This coupling is performed in the similar manner as the coupling to the subscriber B1 according to the description of FIG. 5. The difference is that none of the telefunctions is coupled in the gateway MG1 and that the server S1 gives orders for coupling to be done to the node address NOD3 instead of to the node address NOD1. Another available IP-connection is hunted and also established by the third control unit BC3. The function CP21, corresponding to the communication, is coupled and a re-conversion of the signal format to the IP-format of the communication is carried out. Then the communication is received in the gateway MG2 according to block 83. Thereby the communication is converted from the IP-format to the signal format COM1, and the three telefunctions F21, F22 and F24 are coupled. It should be noted that this coupling of the telefunctions is not made until now in the gateway MG2. The communication is further coupled to the switchboard VX2 with the node address NOD4, according to block 84, in a manner similar to that described in connection to FIG. 5. Thereby the communication is converted to STM-format and the switching and trunking function CP26 is coupled. The returning communication is then coupled from the subscriber B2 to the gateway MG2 according to block 85, at which the telefunction F21 for coding/decoding is coupled to the common signal format COM1 after the conversion from the STM-format. An available communication to the gateway MG1 with a node address NOD5 is hunted by the third control unit in the gateway MG2 and the switching function CP21 is coupled for conversion to the IP-format, all this according to block 86. In the gateway MG1 a conversion is carried out, according to block 87, of the signal format from the IP-format to the common signal format COM1. An available communication to the base station BS1 is hunted and established by the third control unit BC3, the switching and trunking function CP23 is coupled and the signal format is converted back to the ATM-format, block 88. The switchings in the above example, carried out in the respective gateway, are shown in more detail by the preceding embodiment.

It should be noted that, in the examples, the different functions F21–F28 and CP21–CP27 have been retrieved within the gateway at the moment setting about coupling the communication. However, it is possible for a gateway to retrieve an edition of a function from another gateway if all of its own editions of the function in question are busy. For example, the gateway MG1 can retrieve the function F21 for coding/decoding at the gateway MG2 when the gateway MG1 is coupling the communication between the subscribers A1 and B1 according to block 49 in FIG. 3.

In the above description an example of the logical structure of the gateway MG1 has been specified. A few examples of coupling of communications in this gateway have also been described. It can be seen that this coupling requires many steps and in most cases, interconnection of a plurality of the function devices to connect the telefunctions and the switching and trunking functions. This coupling can be done effectively and with saving of resources. Thereby, it is important that the function devices being coupled in a gateway are close to each other in the sense that only small resources are consumed to utilize the functions together. Thus, the sheer physical structure of the gateway is essential. It is also essential to, in the gateway, in an easy manner really being able to find these function devices when they are to be coupled to the communication.

Figure 7A:
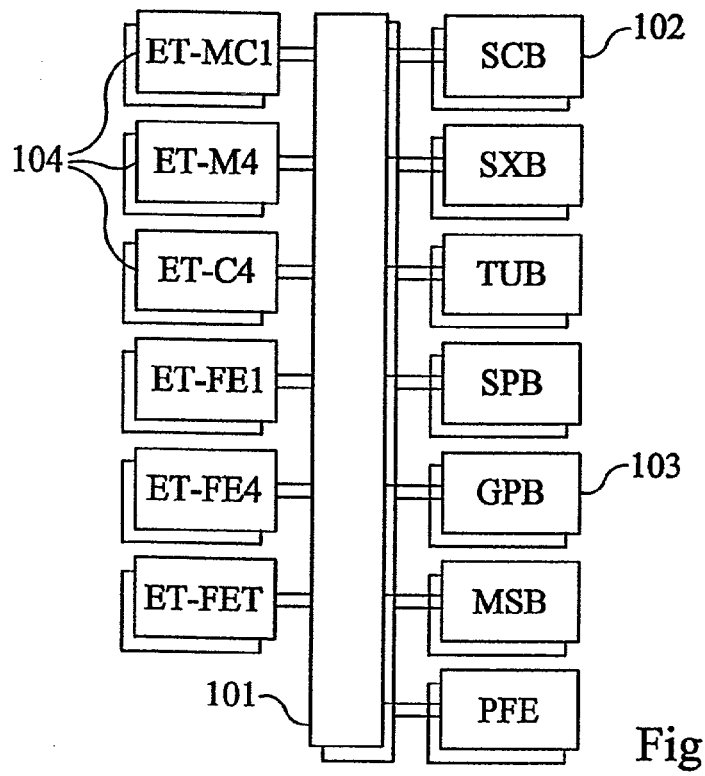
FIG. 7 shows views of parts of the gateway.
Figure 7C:
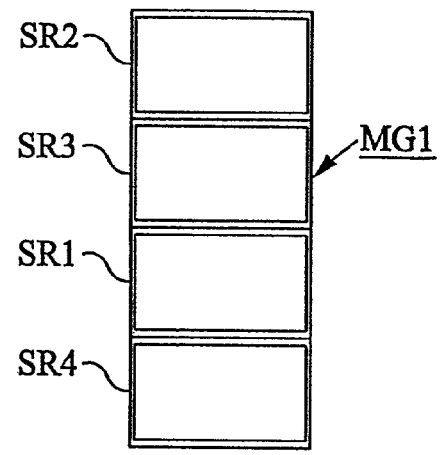
Figure 7B:
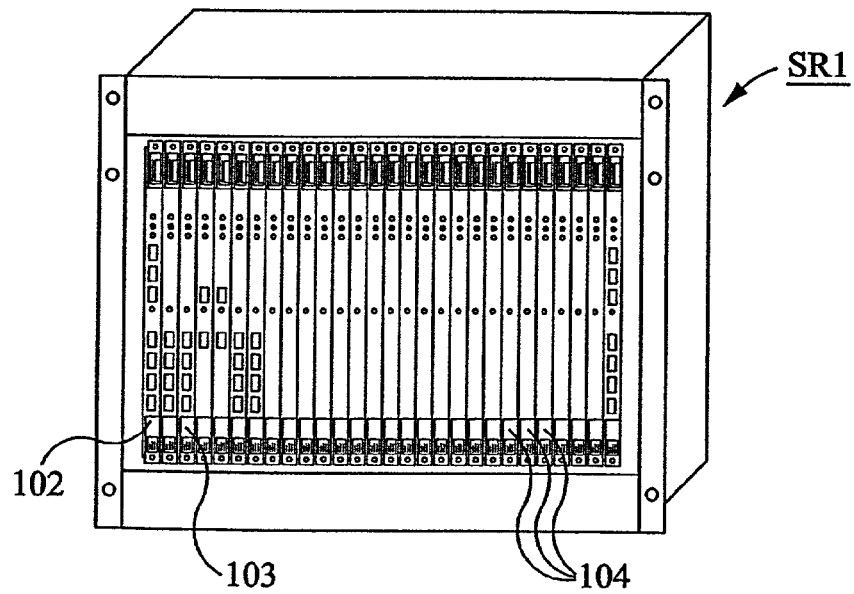

In connection with the FIGS. 7A, 7B and 7C, the structure of the hardware for the gateway MG1 will be described briefly, i.e. the carriers supporting the function devices of the gateway will be described. FIG. 7A shows the structure of the hardware in a magazine. This has a back plane 101 to which different printed board assemblies are connected. As examples of the printed board assemblies can be mentioned a board with the switch core 102 (SCB Switch Core Board), a main board 103 with main processor (GPB General Purpose Board) or board 104 having the above mentioned telefunctions F21–F28. The boards are in the usual manner, according to FIG. 7B, inserted in a magazine SR1, the backside of which containing the back plane 101. The gateway MG1 is composed of one or more magazines, according to the example the magazines SR1, SR2, SR3 and SR4, which are gathered to form a unit according to FIG. 7C and the different back planes of which are connected to each other.

Figure 8:
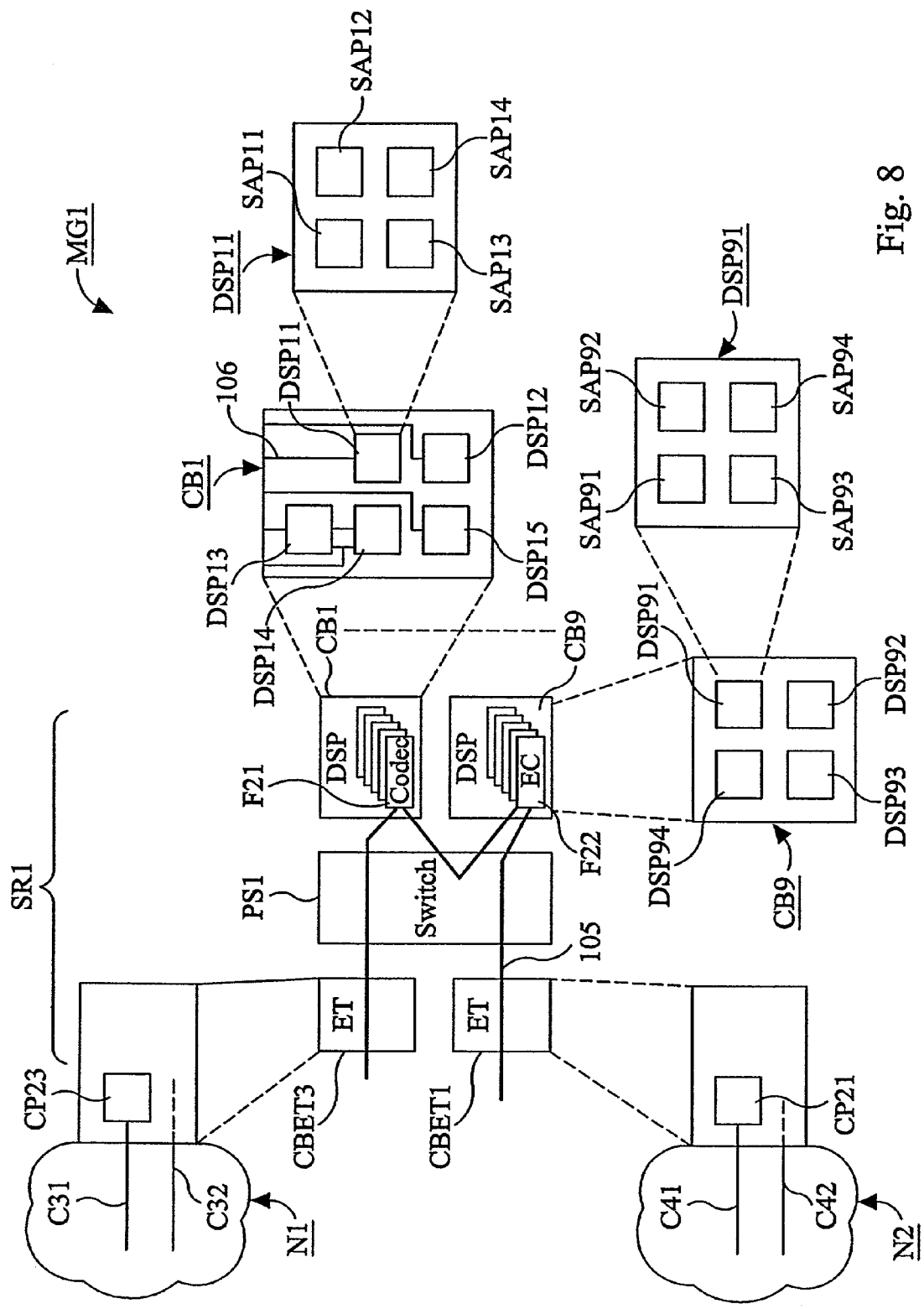
FIG. 8 shows a block diagram of the structure of a part of a gateway.

FIG. 8 shows an example of how the function devices for the telefunctions and the switching and trunking functions are arranged on the printed board assemblies in the magazine SR1–SR4. A printed board assembly CBET1 for switching and trunking functions supports the functions CP21 for IP-routing, and a printed board assembly CBET23 supports the function CP23 for ATM-switching. These two printed board assemblies are placed in the magazine SR1. The Figure also shows in somewhat more detail how the function CP23 communicates with the connection C31 and how the function CP21 communicates with the connection C41. In the same magazine SR1, the printed board assemblies CB1 . . . CB9 are located. The printed board assembly CB1 supports function devices with a number of editions of the coder/decoder F21 in FIG. 2, and the printed board assembly CB9 supports function devices with a number of editions of the echo cancelling function F22. The printed board assemblies are connected by a packet selector PS1, which is shown by a solid line 105 between the printed board assemblies and the packet selector. The Figure also shows some of the printed board assemblies in more detail. The printed board assembly CB1 is shown with five signal processors DSP11–DSP15 with connections 106. The signal processor DSP11 is shown with four access points SAP11–SAP14. One or more editions of a telefunction, in the example the coder/decoder F21, are reachable via one of these access points, e.g. the access point SAP13. The printed board assembly CB9 has four signal processors DSP91–DSP94, the signal processor DSP91 has four access points SAP91–SAB94, and a number of editions of the echo canceller F22 can be reached via the access point SAP92. Signal processors with access points are not shown on the printed board assemblies CBET1 or CBET3.

The allocation of the telefunctions of the printed board assemblies, described in FIG. 8, is denoted distributed allocation since each printed board assembly supports only one type of telefunction. In a corresponding manner there is an integrated allocation shown in FIG. 9. Similarly to what has been described above, the switching and trunking functions are arranged on the printed board assemblies in the magazine SR1, where the printed board assembly CBET1 supports the function CP21 and the printed board assembly CBET3 supports the function CP23. In the magazine SR2, printed board assemblies CB10–CB19 are located. The printed board assembly CB10, as well as the printed board assembly CB19, supports a number of editions of the coder/decoder F21 together with the echo cancelling function F22. The printed board assemblies support signal processors, of which the processor DSP101 is shown, and these have access points of which the access point SAP101 is shown. The printed board assemblies are connected to each other via the packet selector PS1.

The allocations of the functions on the printed board assemblies described above can be carried out as a statistical allocation so that a certain printed board assembly always has a certain number of editions of one of the functions. The integrated allocation can also be carried out as a dynamic allocation. In this case, the number of editions of one of the telefunctions on a printed board assembly can vary, and this number is determined by the requirement at hand. This is possible since the printed board assemblies can have standard processors, with a code in their memories for several different telefunctions. The resource handling becomes more complicated and the control units have to handle the resources from a plurality of printed board assemblies, like a pool of telefunctions. The control units have a list of available and busy resources, and the list is not connected to any specific telefunction.

As mentioned above, it is essential that the coupling of the different function devices is carried out in a resource-saving manner. Thereby, it is essential to limit the utilization of the communication resources needed for coupling the function devices. When two consecutive function devices are located within the same gateway, it is the internal communication resources of the gateway which are utilized. The function devices are coupled in the communication in sequence, as exemplified in FIG. 10. According to block 91, firstly the switching and trunking function CP23 is connected, thereafter the telefunction F21 according to block 92, and after that the telefunction F22 is connected according to block 93, and finally, according to block 94, the switching and trunking function CP21. Closer details concerning similar couplings have been described in connection with FIGS. 3, 4 and 5. The two blocks 92 and 93 couple the consecutive function devices for the telefunctions F21 and F22. In order to save resources when making this coupling and to make it fast, units in the gateway are selected according to the following priority list, where the first hand choice is point 1, the second hand choice is point 2, etc.:

1. The function devices are reached via the same access point.
2. The function devices are handled by the same signal processor.
3. The function devices are handled by signal processors on the same printed board assembly.
4. The printed board assemblies are located in the same magazine.

In the cases where a gateway is allowed to retrieve functions from another gateway in the telecommunication network TS, the following further step is added to the priority list:

5. The magazines belong to the same gateway.

When one of the switching and trunking functions and one of the telefunctions are to be selected after each other, e.g. according to the blocks 91 and 92 or according to the blocks 93 and 94, the following priority list is used:

1. The function devices belong to the same magazine.
2. The function devices belong to the same gateway.

This latter priority list can in an obvious manner be extended to include also, for example, an attempt to select a common printed board assembly as a first step.

Figure 11:
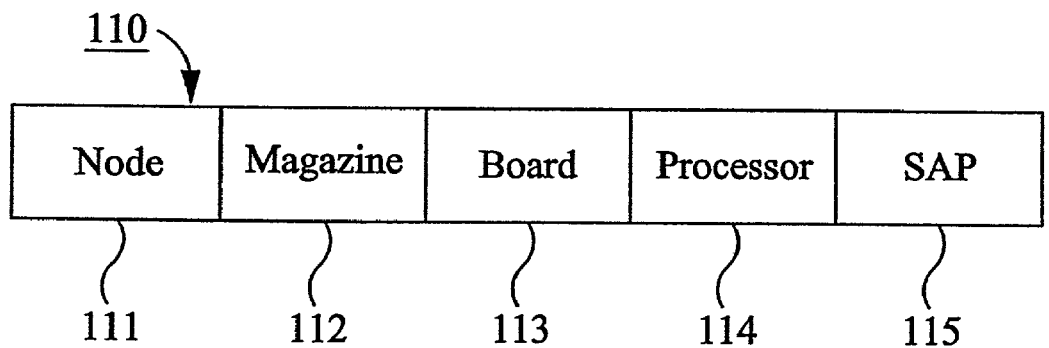
FIG. 11 shows a block diagram with a hierarchic address.
Figure 12:
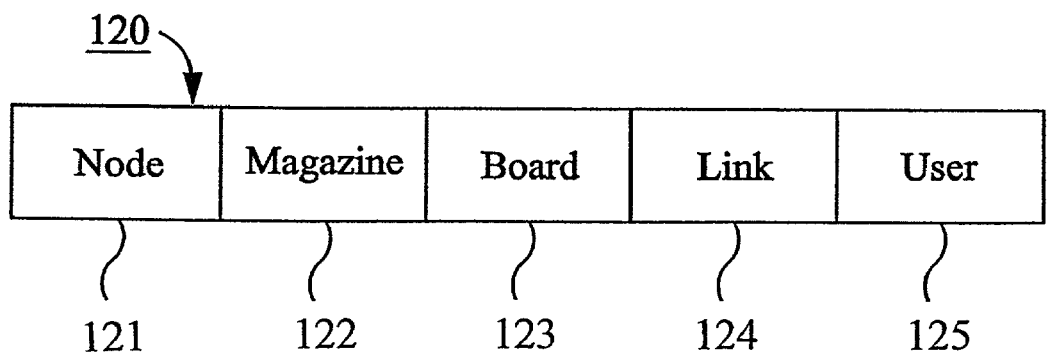
FIG. 12 shows a block diagram with a hierarchic address.

In connection with the FIGS. 3, 4, 5 and 6, it was mentioned that the different function devices CP21–CP27 and F21–F28 have addresses, e.g. the addresses ADR21 and ADR3, which the control units CC1, RC2 and BC3 use for coupling the functions in a communication. More specifically, the addresses are used for being able to find the different function devices and for being able to select in accordance with the predetermined priority lists above. Therefore, the addresses of the function devices are hierarchically arranged, as will be described in connection with the FIGS. 11 and 12. FIG. 11 shows a block diagram with a structure for an address 110 to the telefunctions F21–F28. A block 111 specifies the node in which the function is stored, e.g. in the gateway MG1. A block 112 specifies one of the magazines in this node, e.g. the magazine SR1, a block 113 specifies one of the printed board assemblies in this magazine, e.g. the board CB1, a block 114 specifies one of the processors on this board, e.g. the processor DSP11, and a block 115 specifies one of the access points, e.g. the access point SAP11. The addresses for the telefunctions, e.g. the addresses ADR3 and ADR11, have this structure. FIG. 12 shows a block diagram with a structure for an address 120 to the switching and trunking functions CP21–CP27. A block 121 specifies in which node the function is stored, e.g. the gateway MGW1, a block 122 specifies one of the magazines, e.g. the magazine SR1, and a block 123 specifies one of the printed board assemblies in this magazine, e.g. the printed board assembly CBET3. Besides the location of the functions, the address also specifies, through a block 124, one of the connections which might be provided to the function device in question and, through a block 125, specifies a user on this link. The earlier used address ADR21 has this structure.

In connection with the FIGS. 3–6 it has been explained how the addresses are used for coupling a communication. In connection with the FIGS. 13, 14 and 15 it will be explained in more detail how the hierarchic structure of the addresses-according to the FIGS. 11 and 12 is used for connecting the function devices according to the above mentioned priority lists.

Figure 10:
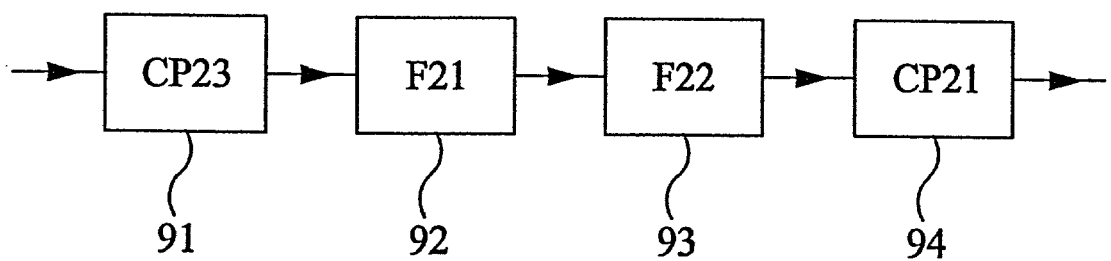
FIG. 10 shows a block diagram of sequential coupling of functions in a communication.
Figure 13:
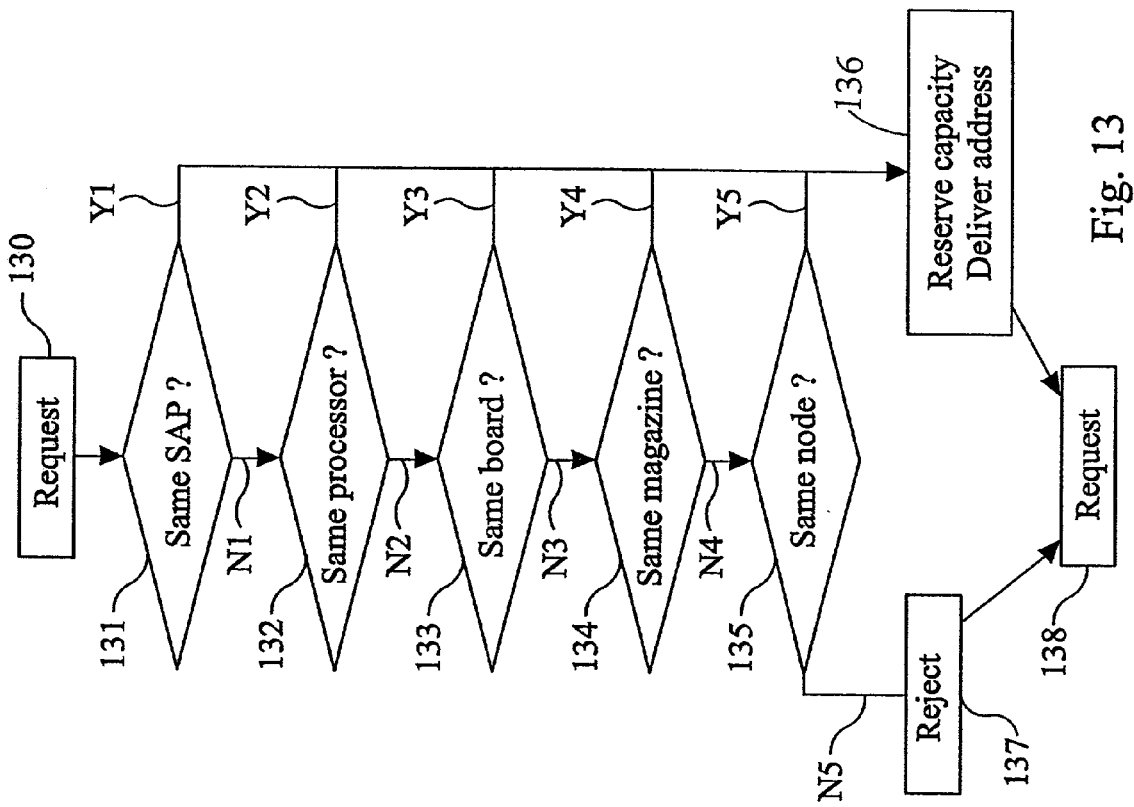
FIG. 13 shows a flow chart for selection of a function in a communication.

FIG. 13 starts from a case in which one of the telefunctions is to be coupled in the communication, for example when an edition of the telefunction F22 according to block 93 in FIG. 10 is coupled. The method starts with the second control unit RC2, in a step 130, receiving a request from the first control unit CC1 to couple the function F22. This request contains the previous address in the chain, i.e. the address for the telefunction F21 in block 92. The second control unit investigates, in a step 131, if the access point for the telefunction F21, block 115 in FIG. 11, can be used. At this the control unit investigates if any edition of the telefunction F22 is available from this access point and also if sufficient processor capacity for handling the function is available. If a positive answer Y1 is received, the processor capacity is reserved and the address for the access point is delivered to the first control unit CC1 in a block 136. If the answer is negative N1, the second control unit RC2 investigates, in block 132, in a corresponding manner whether the signal processor has an edition of the telefunction F21, block 114 in FIG. 11, which can be utilized. Upon a positive answer Y2, the processor capacity is reserved in a corresponding manner and the address, now having another access point, is delivered to the first control unit, the block 136. Upon a negative answer N2, the procedure is repeated in a block 133, with an investigation as to whether an edition of the telefunction F22 is available on the printed board assembly, block 113 in FIG. 11, and whether sufficient processor capacity is available. Upon a positive answer Y3, capacity is reserved and the address is delivered, this time with an access point at another processor. Upon a negative answer N3, the procedure is repeated one more time according to a block 134, at which the second control unit investigates if the magazine for the telefunction F21 has an edition of the telefunction F22 available, with address according to block 112, and if processor capacity is available. Upon a positive answer Y4, the address is delivered, as before, according to block 136, to the first control unit, and the processor capacity is reserved. The address being delivered this time is the address for an access point for a processor on a printed board assembly in the magazine supporting the function F21. Upon a negative answer N4, the second control finally investigates if, in the whole node having the address 111, there is an available edition of the function F22 and sufficient processor capacity. Upon a positive answer Y5, the address to a found access point in the node is delivered, similarly to what has been described above, according to the block 136. If a negative answer N5 is received, the request from the first control unit for the telefunction F22 is refused, according to block 137. Consequently, the method has resulted in either an address according to the block 136 or a refusal according to block 137, and a new inquiry can be processed according to block 138.

As an alternative to the refusal in the block 137, another node in the network might be hunted which might have an edition of the requested function available. The address for its access point, including the address of the node, is supplied to the control unit in question.

Figure 14:
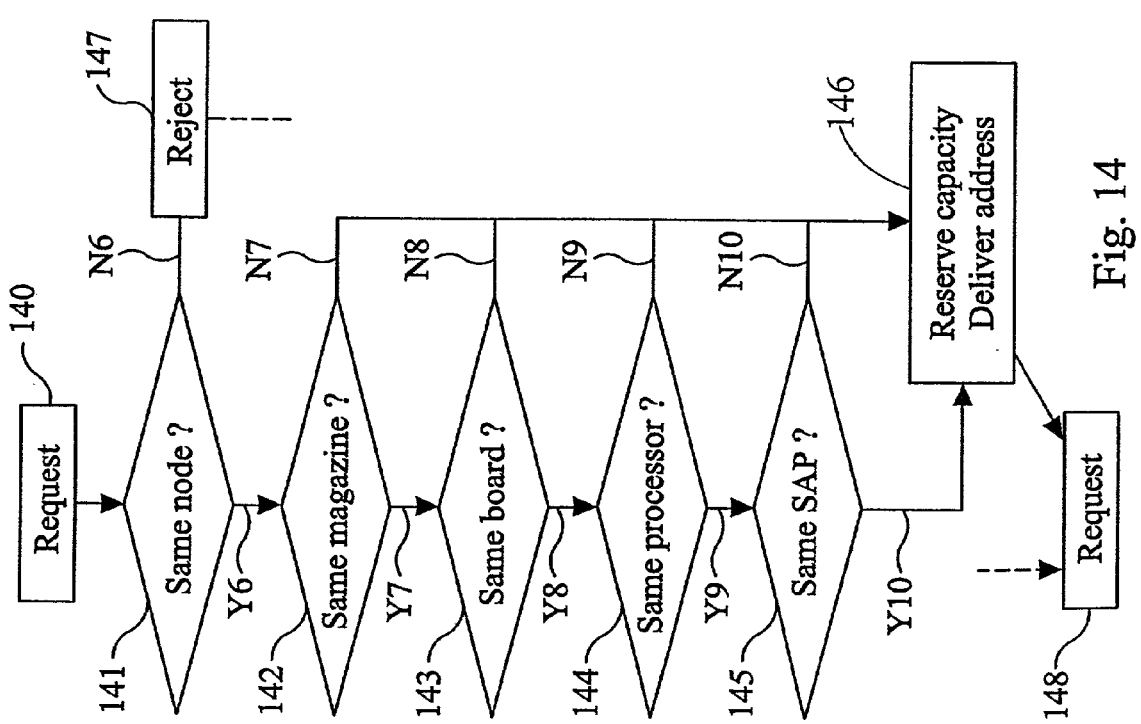
FIG. 14 shows another flowchart for selection of a function in a communication.

An alternative to the method in FIG. 13 will be briefly described in connection with the flowchart of FIG. 14. The method starts with an inquiry for the telefunction F22 from the first control unit CC1 to the second control unit RC2 in a block 140. The second control unit investigates, according to block 141, whether the demanded function F22 can be found in the same node as the previous telefunction F21. Upon a negative answer N6, the request is refused according to block 147. Upon a positive answer Y6, it is investigated whether the function can be found in the same magazine, according to block 142. If thereby a negative answer N7 is received, the address found in the previous step 141 is delivered, and the necessary processor capacity is reserved, as specified by a block 146. Upon a positive answer Y7, it is investigated, according to block 143, whether the function can be found on the same printed board assembly. Upon a negative answer N8, the address from the previous step is delivered, and upon a positive answer Y8, it is investigated, according to block 144, whether the function can be found on the same processor. A negative answer N9 results in the address from the previous step 143 being delivered. A positive answer Y9 results in an investigation according to block 145 as to whether an edition of the demanded telefunction F22 can be found at the same access point as the previous telefunction F21. Upon a negative answer N10, the address found in the previous step is delivered, and upon a positive answer Y10, the recently found address is delivered and processor capacity is reserved, see block 146. A new request can be processed according to block 148. If the telefunction can be retrieved from another node, the method is initiated by a corresponding request.

Figure 15:
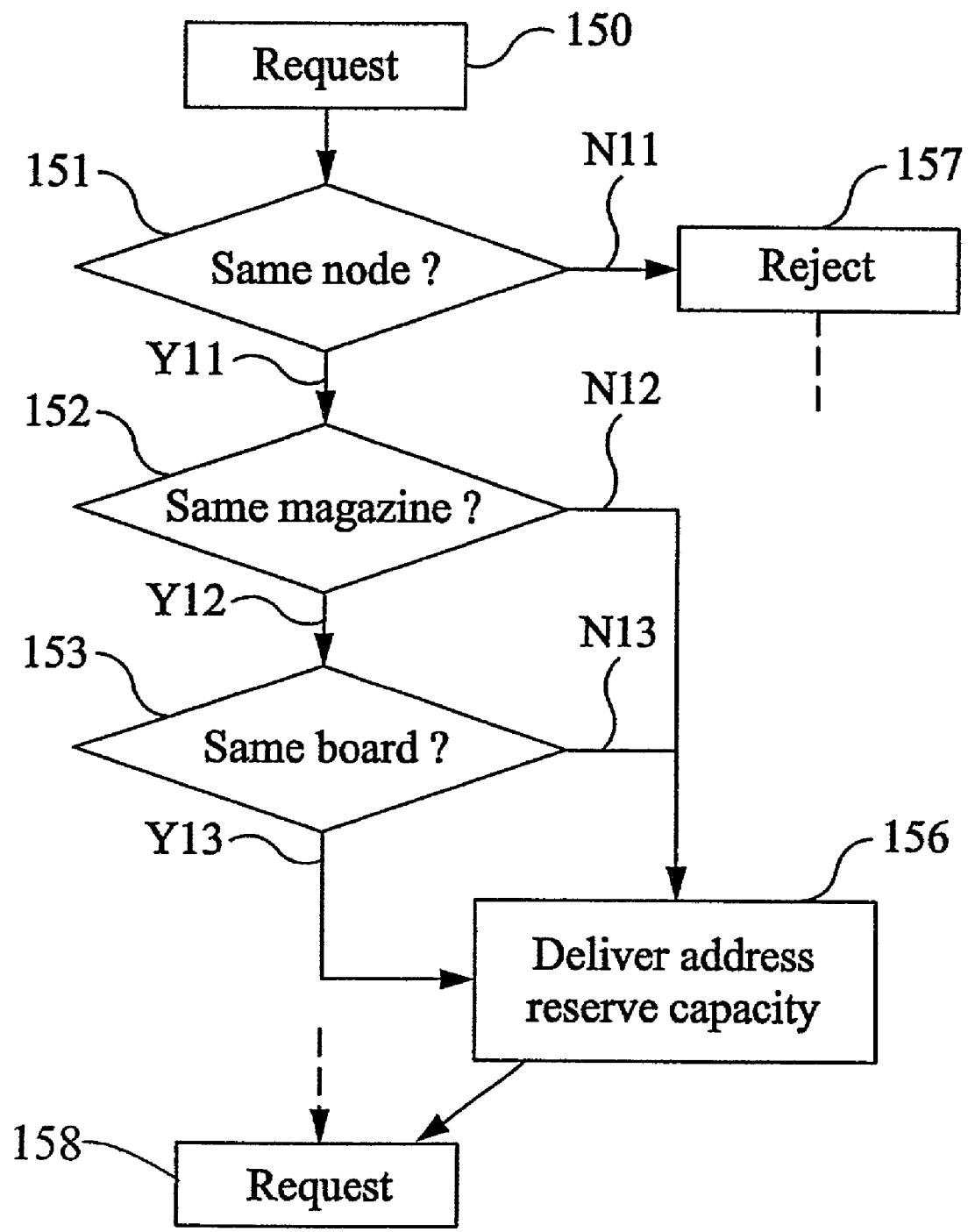
FIG. 15 shows yet another flowchart for selection of a function in a communication.

In connection with FIG. 15 an example will be briefly described, showing how the priority list is used to find a suitably placed edition of the switching and trunking function CP21 in FIG. 10, which has an hierarchic address with a structure having been shown in FIG. 12. In this case it is the third control unit BC3 which receives a request from the first control unit CC1 for an address to the demanded function. This should be located as close as possible to the preceding function, i.e. the telefunction F22. The method is initiated with a request from the third control unit in a block 150. In a block 151 the third control unit BC3 investigates whether there is any available edition of the function CP21 in the node in which the telefunction F22 is located and whether there is necessary processor capacity. Upon a negative answer N11, the request is refused according to block 157. Upon a positive answer Y11, the control unit BC3 investigates, according to block 152, whether there is any available edition of the function CP21 in the same magazine as the telefunction. Upon a negative answer N12, the third control BC3 delivers, according to block 156, the address for the edition of the function CP21 which was found in block 151. The receiver is, as before, the first control unit CC1. Upon a positive answer 12, the third control unit investigates, according to block 153, whether there is an edition of the function CP21 on the printed board assembly which supports the telefunction F22. Upon a negative answer N13, the third control unit BC3 delivers the address to the edition which was found according to block 152. Upon a positive answer Y13, the address found according to block 153 is delivered to the first control unit CC1 together with information about reserved processor capacity, block 156. According to block 158, a new request can be processed.

In connection with FIG. 2, the gateway MG1 was described being used as an example of a coupling node, which can have hierarchically structured carriers. It should be noticed that the coupling node could be effected in another way. One example of such an execution is that the converter CP29 in FIG. 2 is effected similarly to one of the telefunctions in the function block F2. Another example of the execution of the coupling node is that all the functions, the telefunctions F21–F28 as well as the switching and trunking functions CP21–CP27, are gathered in one unit and controlled from one single central control unit. This gives a somewhat simpler but less flexible structure of the coupling node.

It has been described above how the telefunctions as well as the switching and trunking functions are selected for a communication. It has also been shown how a suitable candidate among the processors is selected to handle the functions. It is important that the total processor capacity in a node is utilized effectively. The choice of a processor is therefore carried out in a flexible way, after which it is checked if the selected candidate has sufficient capacity in different respects. If the capacity of the candidate is insufficient, a new candidate is selected which in turn is checked as well. This will be described in more detail below.

Figure 9:
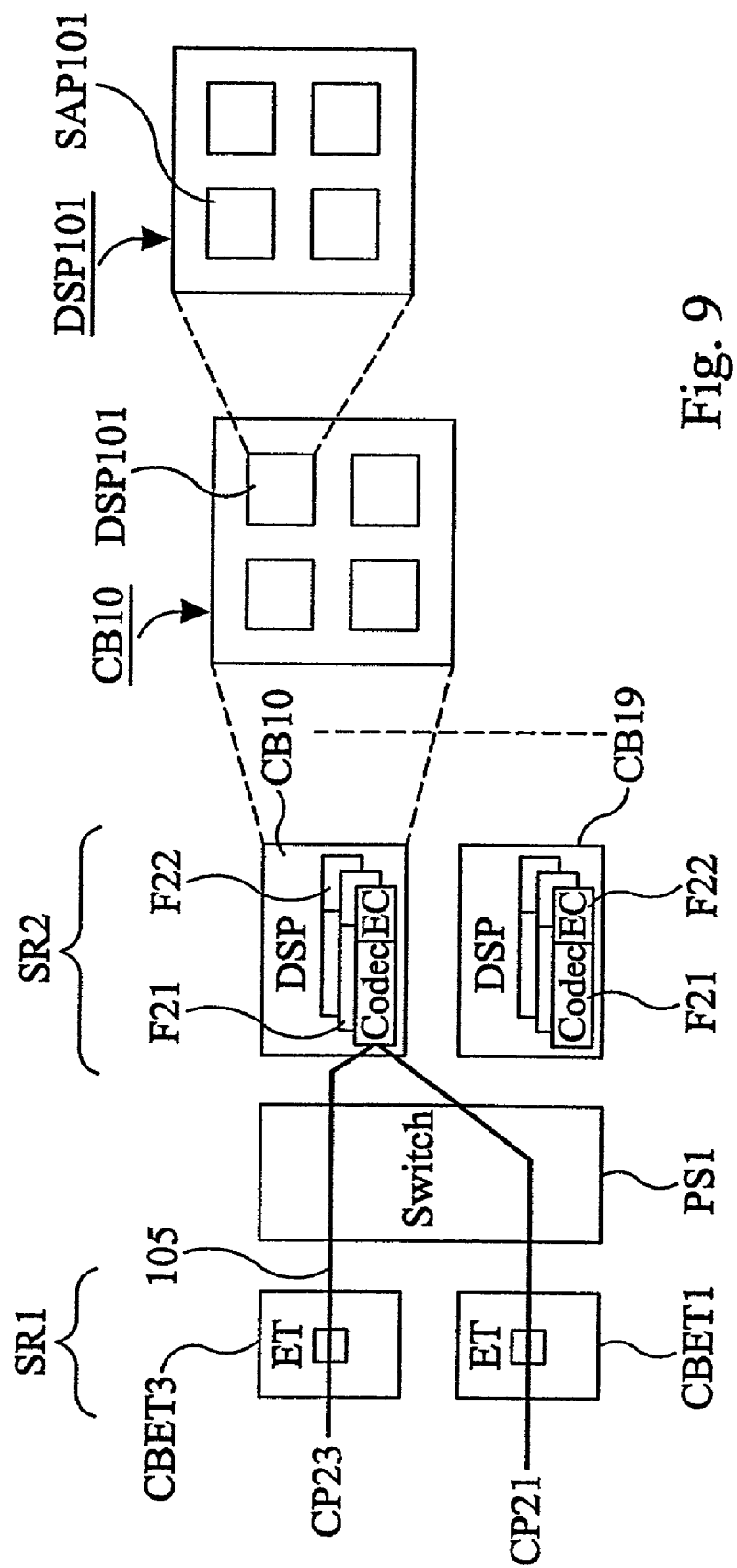
FIG. 9 shows a block diagram of an alternative structure of a part of a gateway.

In connection with FIG. 8 and FIG. 9, the printed board assemblies CB1–CB9 and CB10–CB19 have been described, each of which being able to handle a plurality of the telefunctions F21–F28 simultaneously. Each printed board assembly has a plurality of processors, e.g. the processors DSP91–DSP94, and each processor can handle a plurality of the telefunctions. The total processor capacity from all the printed board assemblies in, for example, the node MG1 can be used effectively if this processor capacity is utilized as a common, flexible resource in the node. Therefore, a printed board assembly in the node cannot have a predetermined number of editions of a certain telefunction stored.

Neither can the allocation of the telefunctions to certain printed board assemblies and their processors remain unchanged, since it is not possible to know in advance how many editions of each of the telefunctions are needed in the node and the demand can vary with time. Therefore, the processors are in general not preloaded with computer codes for the telefunctions, rather the processors are usually handled as common resources in the following way.

Figure 16:
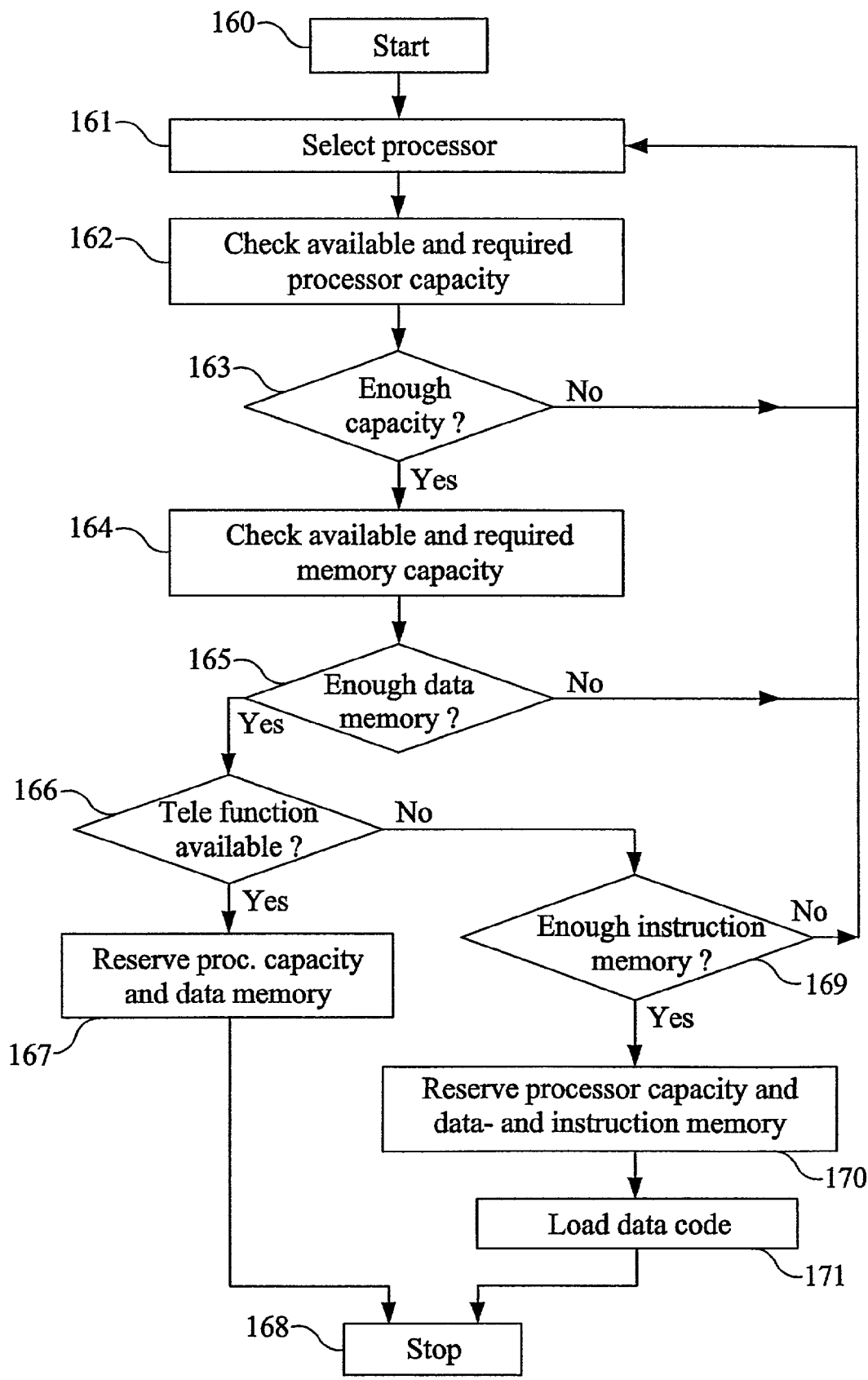
FIG. 16 shows a flowchart for investigating if a processor can handle a function.

1. The instruction memory in each processor is handled as a resource, since each processor can handle a number of the telefunctions but in most cases not all of these. A processor which would handle all of the telefunctions would need a large instruction memory, which is expensive and occupies a large space on the printed board assembly.
2. The processor capacity, expressed in, for example, MIPS (Mega Instructions Per Second) for each processor, is handled as a resource. This makes it possible to fully use the capacity, and at the same time exceeding the available capacity is avoided.
3. The data store for each processor is handled as a resource to be able to fully use this memory and at the same time avoid exceeding available memory capacity. Both the allocation of the data code for the telefunctions and the number of editions of each telefunction in the node depend on the requirements present on a certain occasion. A method for allocating the telefunctions so that the total processor capacity in the node is utilized will be described below in connection with the flowchart in FIG. 16.

When the first control unit CC1 is to allocate one of the telefunctions F21–F28 to the communication, it sends a request for this to the second control unit RC2 according to the previous description. This request is the starting point for the method according to step 160. The data code for the telefunction can be stored on, for example, one of the printed board assemblies CB1–CB9, but, alternatively, also in a central processor in the node MG1 or in another node in the telecommunication system TS. According to a step 161, the second control unit RC2 selects one of the processors, for example according to the earlier described priority list with the items 1–5. The second control unit checks, according to step 162, on one hand, the size of the processor capacity available in the selected processor, and, on the other hand, the size of the processor capacity needed for processing the telefunction in question. Thereafter, the control unit compares whether the capacity of the processor is sufficient according to step 163. If the answer is negative according to an alternative NO, the second control unit RC2 selects a new processor in the step 161. If the answer is positive according to an alternative YES, the second control unit checks, on one hand, the amount of data store needed for the telefunction in question, and, on the other hand, how much memory capacity the processor can provide, all this according to step 164. Thereafter, according to step 165, the second control unit RC2 compares whether the available memory capacity is enough. If the answer is negative, according to an alternative NO, the control unit selects a new processor according to the step 161. If the answer is positive, according to an alternative YES, the second control unit investigates, in step 166, whether the data code for the telefunction in question is available on the processor. If this is not the case, according to an alternative NO, the second control unit RC2 checks, according to a step 169, whether there is room for the data code in the instruction memory. If the answer to this question is negative, according to an alternative NO, a new processor is selected in the step 161. If the answer is positive, according to an alternative YES, the processor capacity, the data store and the instruction memory are reserved in a step 170. Thereafter, the data code is loaded, according to a step 171, and the allocation of the telefunction to the communication is completed, according to a step 168. In the step 166, the second control unit investigated whether the data code for the telefunction in question was available in the processor. If this is the case, according to an alternative YES, the second control unit RC2 reserves the processor capacity and the data store according to a step 167. Thereby, the allocation of the telefunction to the communication is completed according to step 168.

In order to be able to carry out the method described above, the second control unit RC2 has access to the following information concerning, among other things, the processors on the different printed board assemblies.
1. The hierarchic address for the processors.
2. Telefunctions possible to provide by the different printed board assemblies.
3. The amount of available processor capacity which the different processors can provide.
4. The amount of data store available for the different processors.
5. The amount of instruction memory available for the different processors.
6. The amount of processor capacity required for the different telefunctions.
7. The amount of data store required for the different telefunctions.
8. The amount of instruction memory required for the different telefunctions.

In connection with FIG. 9, the printed board assemblies CB10 and CB19 have been described. These printed board assemblies support the coder/decoder F21 together with the echo canceller function F22. According to an alternative to the method in FIG. 16, not only one telefunction at a time is handled when a processor is to be found having sufficient capacity. Instead, at least two of the telefunctions are handled together, e.g. the functions F21 and F22. These two functions can be expected to be utilized at a plurality of call setups. If the two functions are executed together, less processor capacity is consumed than if they are executed separately.

According to a further alternative, the capacity of the hunted processor is compared with threshold values instead of being compared with the capacity required for the function in question. The threshold values are chosen so that, if the capacity of the processor reaches the threshold values, this capacity will be sufficient for each of the functions.

The invention claimed is:
1. A coupling node in a telecommunication system for coupling of communications in the telecommunication system, said coupling node comprising:
   connections for the communications and a connection for a server;
   function devices with functions intended for the communications, the functions being supported by carriers, wherein the function devices are by the carriers arranged in a hierarchic structure;
   processors supported by the carriers;
   a selector device being arranged to couple, after a signal from the server, at least a first of the functions, wherein the selector device is arranged to, at the coupling of at least one of the functions, on one hand hunt for a first one of the processors being a candidate for handling said at least one of the functions, on the other hand investigate whether the hunted processor has resources in the form of sufficient free space in its data store and in its instruction memory and sufficient processor capacity for the handling,
   the coupling node comprises internal communication resources for the function devices;
   the function devices each having their own hierarchic address, corresponding to the hierarchic structure of the function devices, and the selector device being arranged, by means of the hierarchic addresses to select two of the function devices for one of the communi- cations within the communication consecutive of said functions in such a way that the amount of internal communication resources being utilized for connecting said two function devices, is limited.

2. The coupling node in a telecommunication system according to claim 1, wherein the selector device has information on which resources are required for the handling of the function, and is arranged to compare said resources of the hunted processor with the corresponding resources for the handling of the function.

3. The coupling node in a telecommunication system according to claim 1, wherein the selector device is arranged to hunt for a second one of the processors if said first processor lacks resources for the handling.

4. The coupling node according to claim 1, wherein the carriers for the function devices comprise at least one magazine with printed board assemblies, which are connected to each other via a back plane in the magazine and which support the processors with access points, the selector device being arranged to select the two function devices in one and the same magazine.

5. The coupling node according to claim 4, wherein one of the printed board assemblies supports function devices having only one type of functions.

6. The coupling node according to claim 4, wherein one of the printed board assemblies supports function devices having at least two different types of functions.

7. The coupling node according to claim 1, wherein the carriers for the function devices comprise at least one magazine with printed board assemblies, which are connected to each other via a back plane in the magazine and which support the processors with access points, the selector device being arranged to select the two function devices in one and the same printed board assembly.

8. The coupling node according to claim 1, wherein the carriers for the function devices comprise at least one magazine with printed board assemblies, which are connected to each other via a back plane in the magazine and which support the processors with access points, the selector device being arranged to select the two function devices in one and the same processor.

9. The coupling node according to claim 1, wherein the carriers for the function devices comprise at least one magazine with printed board assemblies, which are connected to each other via a back plane in the magazine and which support the processors with access points, the selector device being arranged to select the two function devices so that they will have the same access point in one of the signal processors.

10. The coupling node according to claim 1, wherein the carriers for the function devices comprise at least one magazine with printed board assemblies, which are connected to each other via a back plane in the magazine and which support the processors with access points, the selector device being arranged to select the two function devices, in the first place, in the same printed board assembly and, in the second place, in the same magazine.

11. The coupling node according to claim 1, wherein the carriers for the function devices comprise at least one magazine with printed board assemblies, which are connected to each other via a back plane in the magazine and which support the processors with access points, the selector device being arranged to select the two function devices, in the first place so that they can be reached via the same access point, in the second place so that they can be handled by one and the same processor, in the third place so that they can be handled by the processors in the same printed board assembly, and in the fourth place so that the printed board assemblies are placed in the same magazine.

12. A method for a coupling node in a telecommunication system for coupling of a communication, the coupling node comprising connections for communications and a connection for a server; function devices with functions, intended for the communications and supported by carriers; and processors supported by the carriers, the method comprising:

selecting at least one of the functions after a signal from the server;

hunting for a first processor as a candidate for handling of said function; and investigating whether the hunted processor has sufficiently free space in its data store and in its instruction memory and sufficient processor capacity for said handling, wherein the coupling node comprises internal communication resources for the function devices;

arranging the function devices in a hierarchic structure by means of the carriers for the function devices;

allocating to each of the function devices a hierarchic address, corresponding to the hierarchic structure of the function devices; and selecting, by means of the hierarchic addresses, two of the function devices for one of the communications within the communication consecutive of said functions in such a way that the amount of internal communication resources being utilized for connecting said two function devices, is limited.

13. The method for a coupling node according to claim 12, further comprising comparing, in the selector device, said resources in the hunted processor with the corresponding resources required for handling the function.

14. The method for a coupling node according to claim 12, further comprising hunting, by the selector device, for a second processor if said first processor lacks resources for the handling.

15. The method according to claim 12, wherein the carriers for the function devices comprise at least one magazine with printed board assemblies, which are connected to each other via a back plane in the magazine and which support processors with access points, the method comprising selection of the two function devices in the same magazine.

16. The method according to claim 15, wherein one of the printed board assemblies supports function devices having only one type of functions.

17. The A method according to claim 15, wherein one of the printed board assemblies supports function devices having at least two different types of functions.

18. The method according to claim 12, wherein the carriers for the function devices comprise at least one magazine with printed board assemblies, which are connected to each other via a back plane in the magazine and which support processors with access points, the method comprising selection of the two function devices in the same printed board assembly.

19. The method according to claim 12, wherein the carriers for the function devices comprise at least one magazine with printed board assemblies, which are connected to each other via a back plane in the magazine and which support processors with access points, and wherein the method comprises selecting the two function devices in the same signal processor.

20. The A method according to claim 12, wherein the carriers for the function devices comprise at least one magazine with printed board assemblies, which are connected to each other via a back plane in the magazine and which support processors with access points, and wherein the method comprises selecting the two function devices so that they will have the same access point in one of the processors.

21. The A method according to claim 12, wherein the carriers for the function devices comprise at least one magazine with printed board assemblies, which are connected to each other via a back plane in the magazine and which support processors with access points, and wherein the method comprises selecting the two function devices, in the first place, in the same printed board assembly and, in the second place, in the same magazine.

22. The method according to claim 12, wherein the carriers for the function devices comprise at least one magazine with printed board assemblies, which are connected to each other via a back plane in the magazine and which support processors with access points, and wherein the method comprises selecting the two function devices, in the first place so that they are reached via the same access point, in the second place so that they are handled by the same processor, in the third place so that they are handled by processors in the same printed board assembly, and in the fourth place so that the printed board assemblies are placed in the same magazine.

\* \* \* \* \*